United States Patent
Yang et al.

(10) Patent No.: US 7,672,410 B2
(45) Date of Patent: Mar. 2, 2010

(54) DIVERSITY RECEIVER

(75) Inventors: Fang Ming Yang, Tai Nan (TW); Hung Chi Lai, Kao Hsiung (TW); Kuo Li Lai, Tai Chung (TW); Ching-Piao Hung, Hsin Chu County (TW); Chun We Huang, Taipei (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 703 days.

(21) Appl. No.: 11/527,693

(22) Filed: Sep. 27, 2006

(65) Prior Publication Data

US 2007/0071150 A1 Mar. 29, 2007

(30) Foreign Application Priority Data

Sep. 28, 2005 (TW) ................. 94133665 A

(51) Int. Cl.
*H04L 1/02* (2006.01)
(52) U.S. Cl. ...................................... 375/347
(58) Field of Classification Search ................. 375/316, 375/340, 341, 343, 346, 347, 348, 349; 455/132–137, 455/130; 714/699, 746, 752, 780
See application file for complete search history.

(56) References Cited

U.S. PATENT DOCUMENTS 6,151,372 A 11/2000 Yamamoto

| | | | |
|---|---|---|---|
| 6,792,258 B1 | 9/2004 | Nokes et al. | |
| 7,228,113 B1 * | 6/2007 | Tang et al. | 455/101 |
| 2002/0021773 A1 | 2/2002 | Henriksson | |
| 2005/0063345 A1 * | 3/2005 | Wu et al. | 370/335 |
| 2005/0287978 A1 * | 12/2005 | Maltsev et al. | 455/403 |
| 2008/0219341 A1 * | 9/2008 | Kim | 375/232 |

* cited by examiner

*Primary Examiner*—David C Payne
*Assistant Examiner*—Vineeta S Panwalkar
(74) *Attorney, Agent, or Firm*—Muncy, Geissler, Olds & Lowe, PLLC

(57) ABSTRACT

This invention provides a diversity receiver, which has N branches for receiving M versions of an input signal. The diversity receiver comprises N channel state information estimators, a demodulator and a combining and demapping device. After receiving the M versions of the input signal, the demodulator performs demodulation and then generates M demodulated signals. N channel state information estimators, one channel state information estimator equipped for each branch, respectively fetches the signals from the demodulator to generate M channel parameters related to the M versions of the input signal. The combining and demapping device receives the M demodulated signals, performs signal combining operations and symbol demapping, and finally generate a pre-correcting signal.

51 Claims, 17 Drawing Sheets

US 7,672,410 B2

DIVERSITY RECEIVER

This application claims the benefit of the filing date of Taiwan Application Ser. No. 094133665, filed on Sep. 28, 2005, the content of which is incorporated herein by reference.

BACKGROUND OF THE INVENTION

1. Field of the invention

The present invention generally relates to a receiver and, more specifically, to a diversity receiver with either time-domain or frequency-domain channel state estimation.

2. Description of the Related Art

In an orthogonal frequency division multiplexing system, there are multiple orthogonal subcarriers that are usually modulated independently. For a time-varying channel, inter-channel-interference significantly degrades the system performance and causes an error floor in bit error rate performance even when the channel is estimated and equalized.

Diversity reception is a technique that has been widely used, especially in mobile reception. Generally, a diversity receiver comprises at least two antennas and the successive signal processing to combine input signals from separate branches. The two antennas are spaced apart so as to receive different versions of a transmitted signal.

U.S. Pat. No. 6,151,372 discloses a diversity receiver, comprising two identical branches for receiving and processing input signals. There are two different circuit architectures for a diversity processing unit 120 located between Fourier transform circuits 111, 112 and parallel-serial conversion circuit 130. They are signal combining and signal selecting architectures. FIG. 1A is a diagram showing a signal combining architecture of a diversity processing unit. Referring to FIG. 1A, the diversity processing unit 120 having two propagation paths $P_1$, $P_2$ comprises two propagation path characteristic estimating units 121a, 121b, two complex conjugate sections 122a, 122b, two complex multipliers 123a, 123b and a combiner 124. Take the propagation path $P_1$, for example. The propagation path characteristic estimating unit 121a estimates a channel frequency response $H_1(.)$ of the propagation path $P_1$. The complex conjugate section 122a generates $H_1^*(.)$, which is complex conjugate of the channel frequency response $H_1^*(.)$. The complex multiplier 123a complex multiplies the output from the Fourier transform circuit 111 by $H_1^*(.)$, which is complex conjugate generated at the complex conjugate section 122a. The combiner 124 combines the multiplication results from complex multipliers 123a, 123b to be provided to the parallel-serial conversion circuit 130.

FIG. 1B is a diagram showing a signal-selecting architecture of a diversity processing unit. The diversity processing unit comprises two propagation path characteristic estimating units 121a, 121b, a comparator 125, a selector 126. The comparator 125 provides a selection signal for selecting a signal received through a propagation path exhibiting a high amplitude based on two channel frequency responses $H_1(.)$, $H_2(.)$. According to the selection signal, the selector 126 selects a signal from outputs of the Fourier transform circuits 111, 112, and then sends the selected signal to the parallel-serial conversion circuit 130.

FIG. 2 is a block diagram of a diversity receiver according to the prior art. U.S. Pat. No. 6,792,258 describes a diversity receiver 200, comprising two antennas 201a, 201b, two tuners 202a, 202b, two demodulators 203a, 203b, two pre-processors 204a, 204b, a channel state qualified soft decision combiner 205, a Viterbi decoder 206, a post-processor 207 and a diversity controller 208. The diversity controller 208 receives the outputs from two pre-processors 204a, 204b, and the Viterbi decoder 206 for measuring the signal quality of two propagation paths P1, P2, and then dynamically programs tuners 202a, 202b. The diversity controller 208 is not only responsible for selecting two diversity sources which provide the best signals to present to tuners 202a, 202b, but also adapted to operate in one or more diversity modes in accordance with four diversity types comprising frequency diversity, antenna spatial diversity, antenna polarization diversity and antenna pattern diversity, therefore ensuring the signal quality of the diversity receiver 200.

FIG. 3 is a block diagram of another diversity receiver according to the prior art.

U.S. Patent Application No. 2002/0021773 describes another diversity receiver. Referring now to FIG. 3, a diversity receiver 300 comprises two fast Fourier transform (FFT) circuits 311, 312, two soft bit generators 301a, 301b, two channel estimators 302a, 302b, two filters 303a, 303b, a router 304 and a combiner 124. The diversity receiver 300 has two identical branches 310, 320, which are functionally equivalent. As for the branch 310, the channel estimator 302a generates and applies channel estimates (e.g. channel frequency response H1(.)) to both the soft bit generator 301a and the filter 303a for improving the channel distortion and increasing the stability of channel estimates. The router 304 receives two output values from two filters 303a, 303b to compare the signal qualities of two branches 310, 320 and then decides whether to route one or both of the signals from branches 310, 320. Next, the combiner 124 performs signal combining or signal selecting operations according to the output signal from the router 304. Wherein, the router 304 uses two signal combining methods. They are maximal ratio combining (MRC) and equal gain combining (EGC).

However, the previously discussed three diversity receivers merely refers to the channel frequency response estimate H(.) before signal combining is performed, thus revealing unqualified signal quality under some channel environments. The diversity receiver of the invention fully utilizes all the channel information available to derive all related parameters required for diversity combining, therefore enhancing the quality and stability of signal for combining.

SUMMARY OF THE INVENTION

In view of the above-mentioned problems, an object of the invention is to provide a diversity receiver with either time-domain or frequency-domain channel state estimation, which precisely measures and combines all diversity branches to seek all possible gains, therefore enhancing the quality of signal and maintaining stability of the system.

To achieve the above-mentioned object, the diversity receiver of the present invention has N branches for receiving M versions of an input signal. The diversity receiver comprises N channel state information estimators, a demodulator and a combining and demapping device. The demodulator receives the M versions of the input signal, performs modulation in accordance with a corresponding set of channel frequency response estimates, and then generates M corresponding demodulated signals. The N channel state information estimators respectively equipped for N branches, respectively fetch the signals from the demodulator and then generate M channel parameters related to the M versions of the input signal. The combining and demapping device receives the M demodulated signals to perform signal combining and symbol demapping in accordance with the channel parameters related to each version of the input signal, and finally generates a pre-correction signal.

The channel state information estimators of the invention can employ either time-domain signals or frequency-time signals within the demodulator for estimation. When the sources fetched by the channel state information estimators are time-domain signals, the computing complexity is relatively low, but the estimated channel information is relatively inaccurate; therefore, the quality of signal after diversity combining is usually poor. On the other hand, when the sources fetched by the channel state information estimators are frequency-domain signals, the computing complexity is relatively high, yet the estimated channel information is relatively accurate; thus, the quality of signal after diversity combining is much better.

DETAILED DESCRIPTION OF THE INVENTION

The diversity receiver of the invention will be described with reference to the accompanying drawings.

Figure 1A:
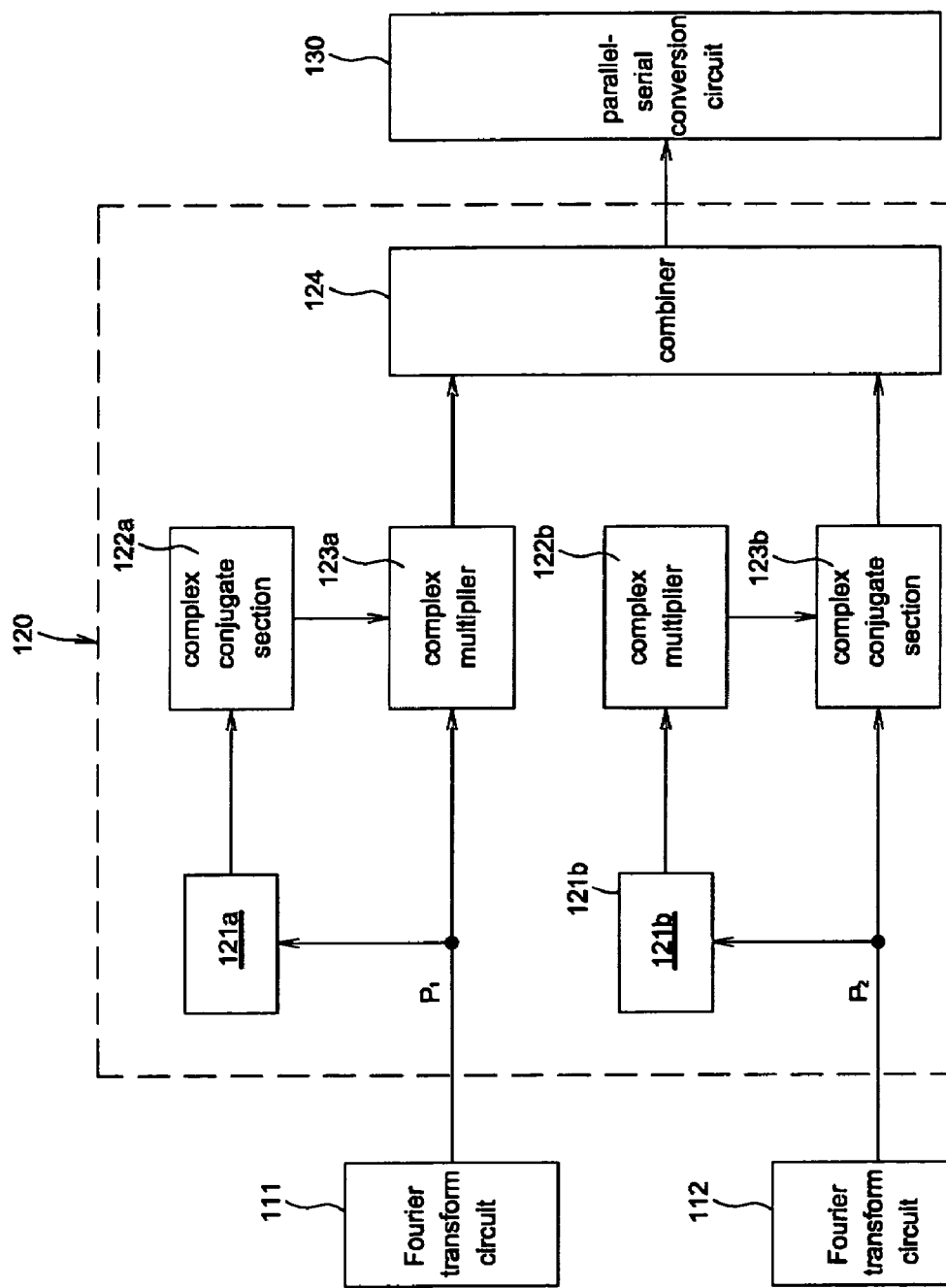
FIG. 1A is a diagram showing a signal-combining architecture of a diversity processing unit.
Figure 1B:
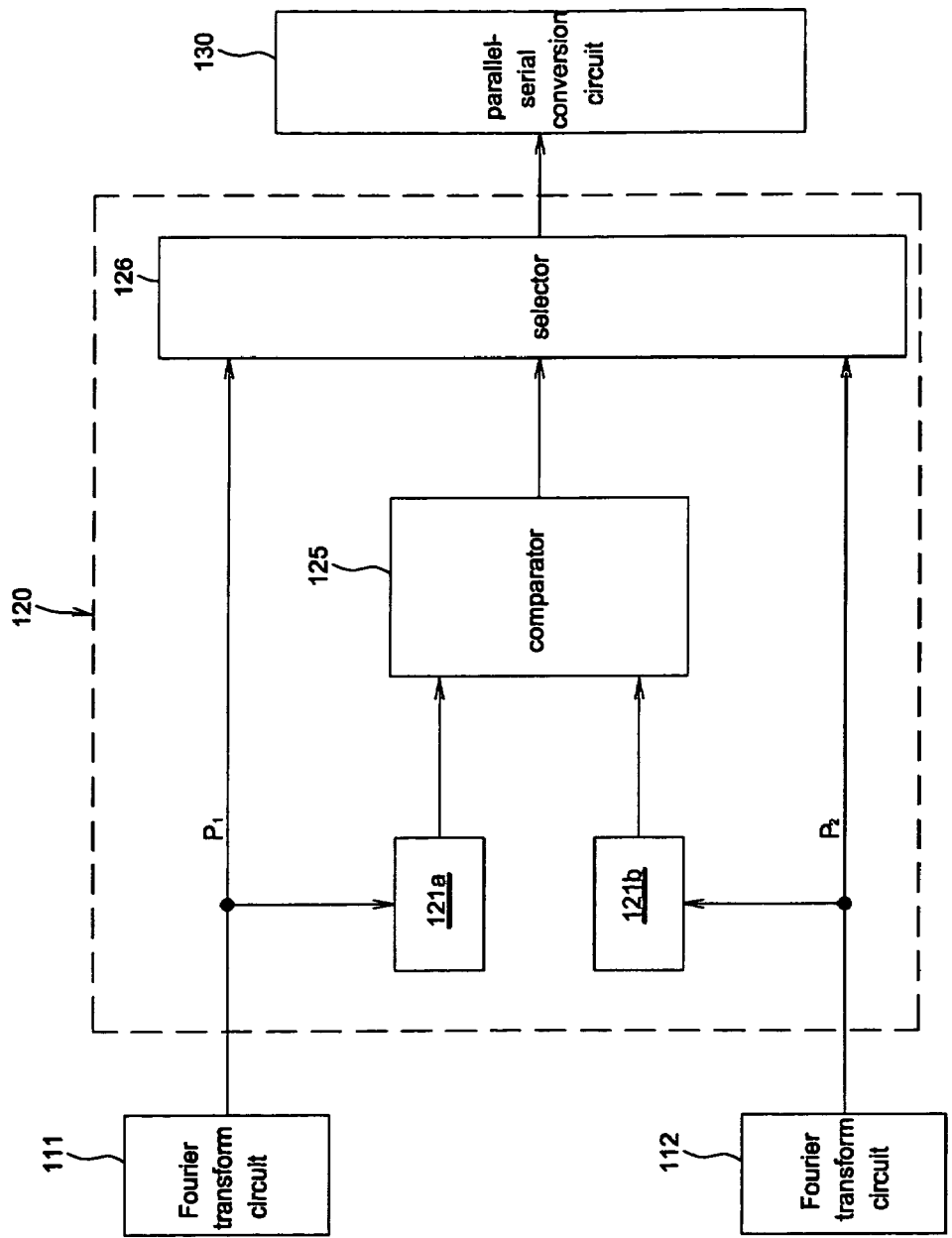
FIG. 1B is a diagram showing a signal-selecting architecture of a diversity processing unit.
Figure 2:
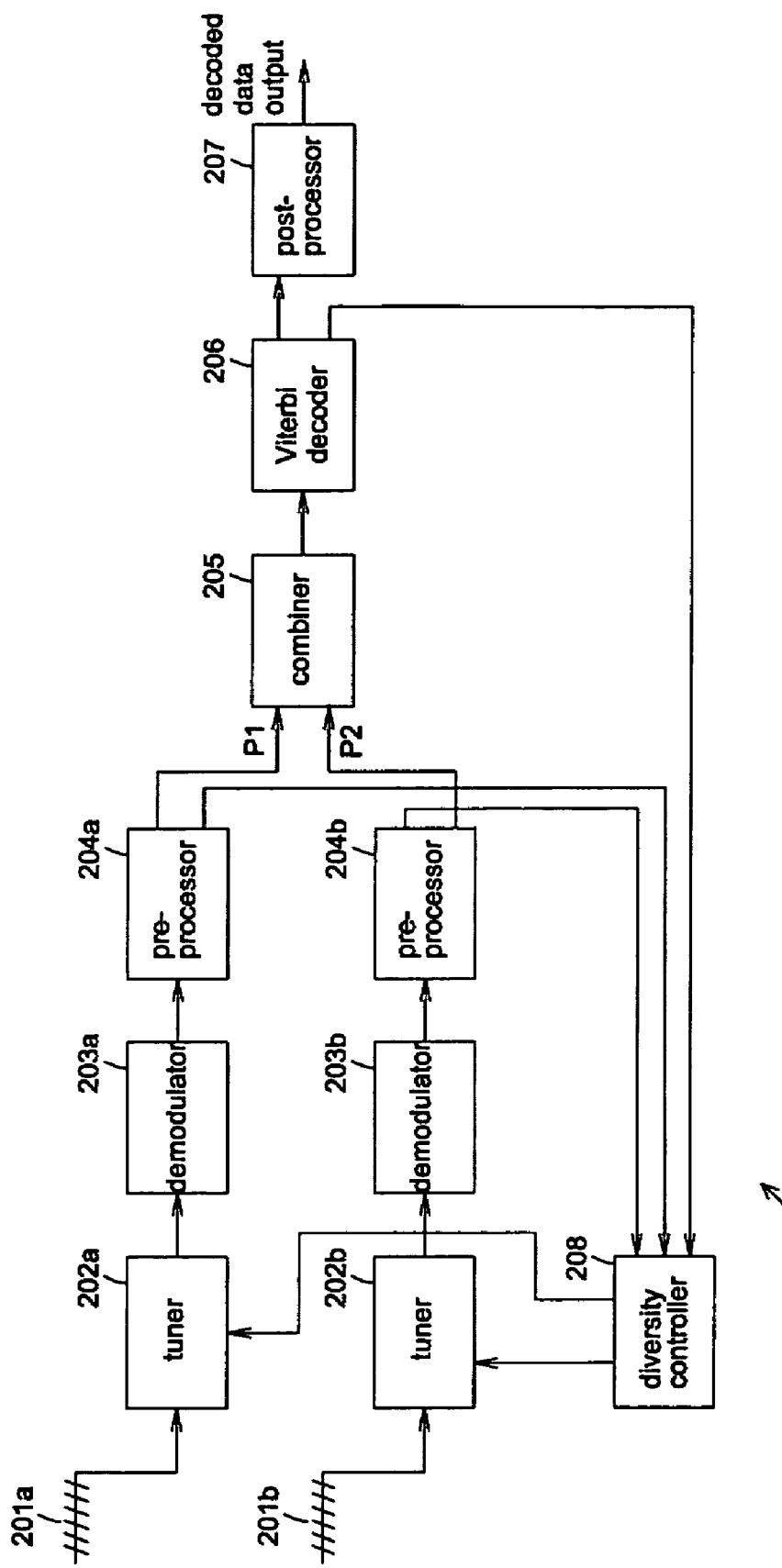
FIG. 2 is a block diagram of a diversity receiver according to the prior art.
Figure 3:
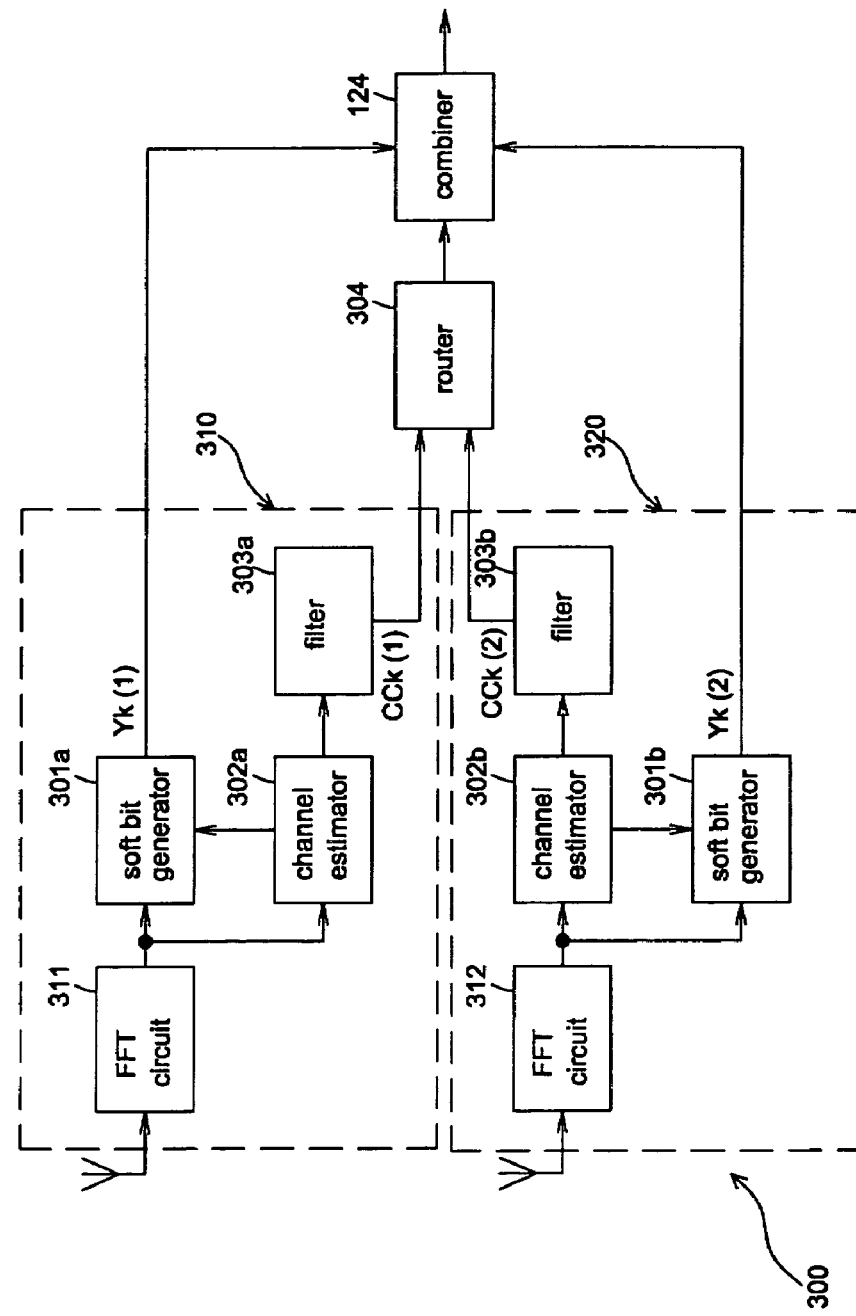
FIG. 3 is a block diagram of another diversity receiver according to the prior art.
Figure 4A:
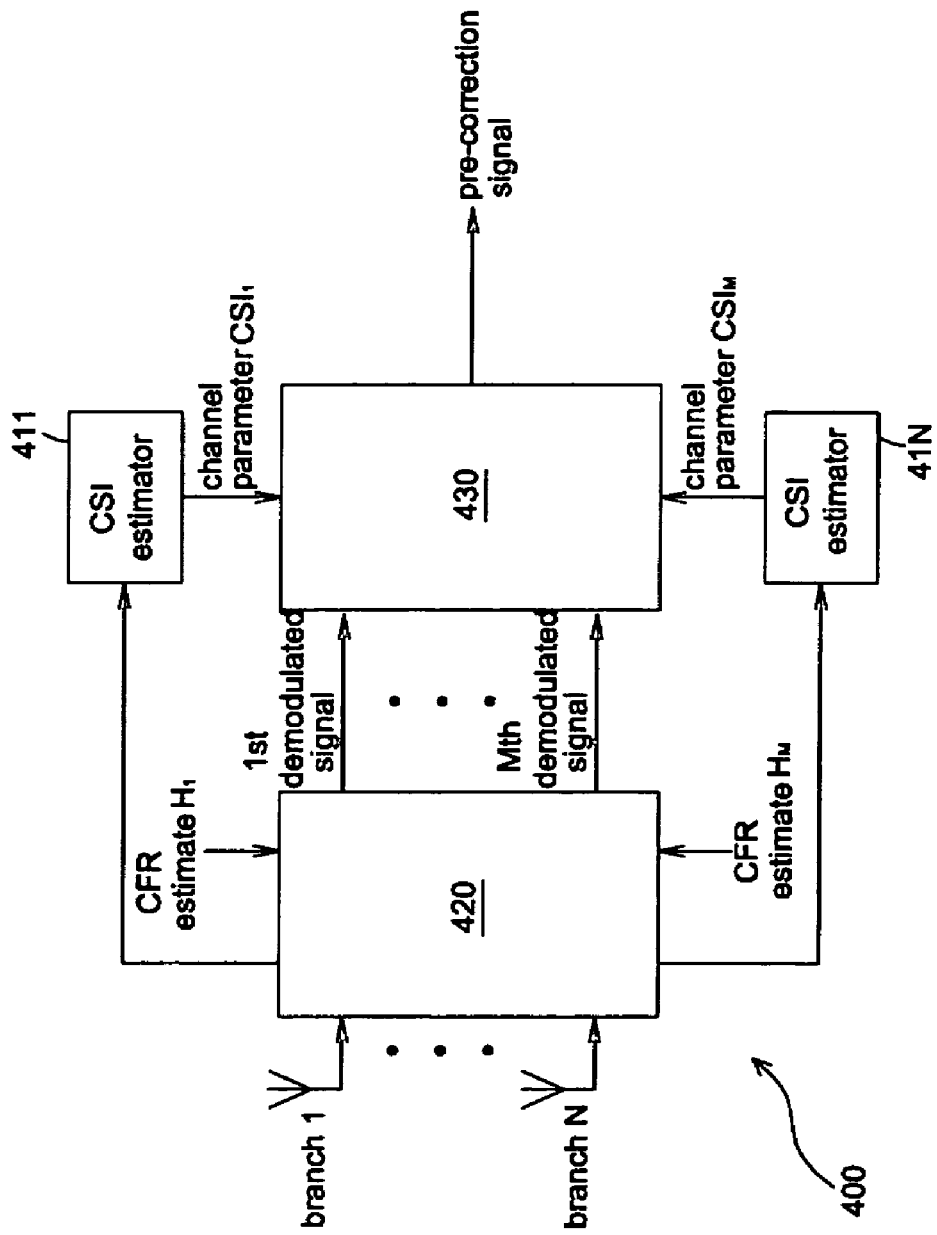
FIG. 4A is a block diagram illustrating a diversity receiver having N branches according to the invention.

FIG. 4A is a block diagram illustrating a diversity receiver having N branches according to the invention. Referring to FIG. 4A, a diversity receiver 400 embodying the invention has N (N is a positive integer, and N≧2.) branches for receiving M (M is a positive integer, and M≧2.) versions (not shown) of an input signal. The diversity receiver 400 comprises a demodulator 420, N channel state information (CSI) estimators 411~41N and a combining and demapping device 430. The demodulator 420 receives the M versions of the input signal, performs modulation in accordance with a corresponding set of channel frequency response (CFR) estimates H related to each version of the input signal, and then generates M demodulated signals. N channel state information estimators 411~41N, respectively equipped for N branches, fetch the data from the demodulator 420 and then respectively generate M channel parameters $CSI_1$-$CSI_M$ related to the M versions of the input signal. The channel parameters are divided into two categories: symbol-level parameters and subcarrier-level parameters. Wherein, a symbol-level parameter is equivalent to the average of all the respective subcarrier-level parameters. The combining and demapping device 430 receives the M demodulated signals to perform signal-combining and symbol demapping in accordance with the channel parameters related to each version of the input signal, and finally generates a pre-correction signal.

Figure 4B:
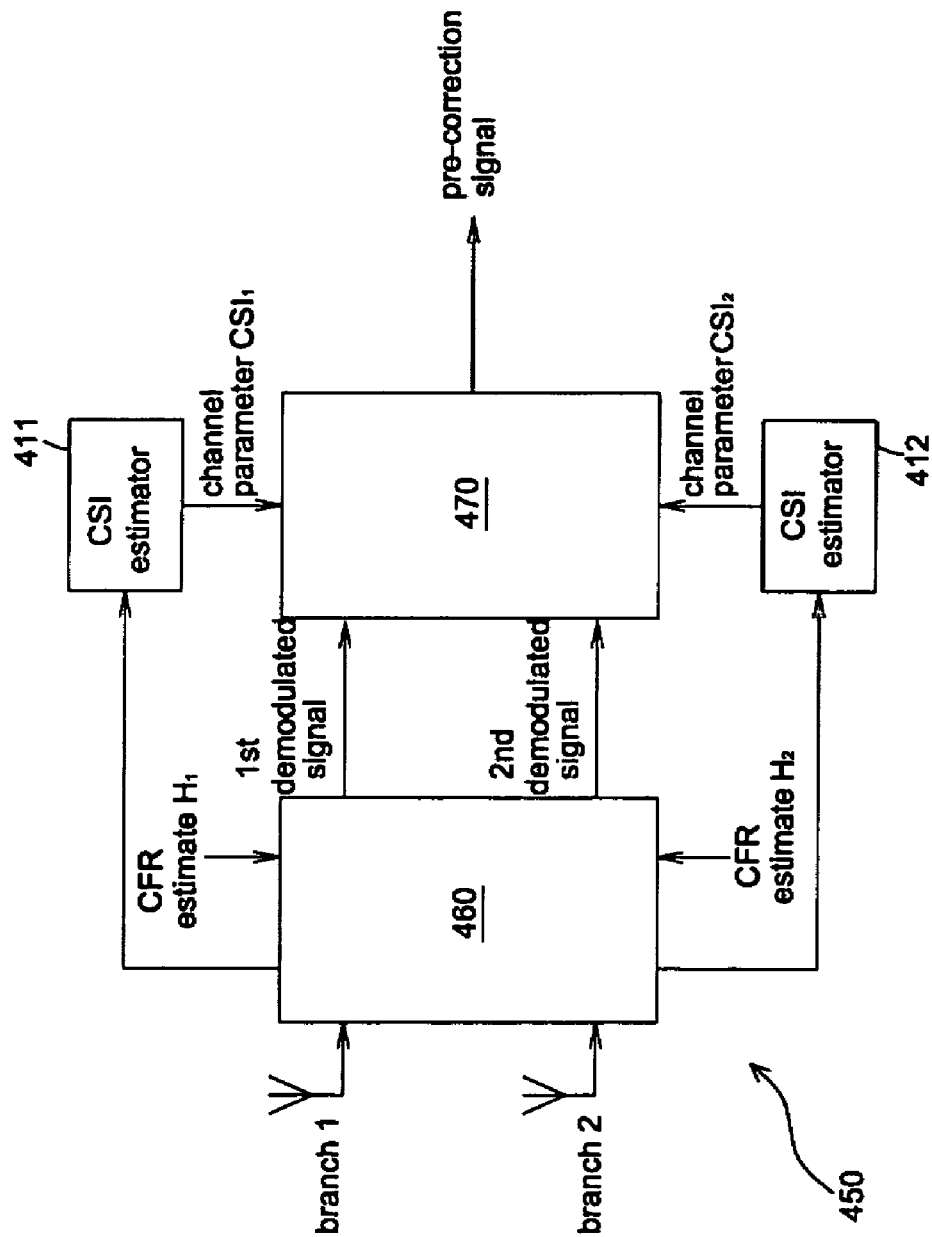
FIG. 4B is a block diagram illustrating a diversity receiver having two branches according to the invention.

While N=2 and M=2, a block diagram of the diversity receiver is illustrated in FIG. 4B. The diversity receiver 450 comprises a demodulator 460, two channel state information estimators 411~412 and a combining and demapping device 470. The demodulator 460 receives a first version of the input signal and a second version of the input signal, performs modulation in accordance with a set of channel frequency response estimates $H_1$, $H_2$ related to each of the first and the second versions of the input signal, and then generates a first and a second demodulated signals. The combining and demapping device 470 receives the first and the second demodulated signals to perform signal combining and symbol demapping in accordance with the channel parameters related to each of the first and the second versions of the input signal, and then generates a pre-correction signal. Since functions of channel state information estimators have been discussed in FIG. 4A, the description is omitted here.

However, since the structure of the channel environments is typical unknown, a diversity receiver must estimate all channel parameters required to realize the entire available gain for measuring and combining all branches precisely. According to the invention, channel parameters or information required for signal combining either vary with different locations for performing signal combining within the diversity receiver, or are limited to different signal sources (time-domain or frequency-domain). Hereinafter, for an intelligible explanation, all embodiments of the invention are described with N=2, M=2.

Figure 5A:
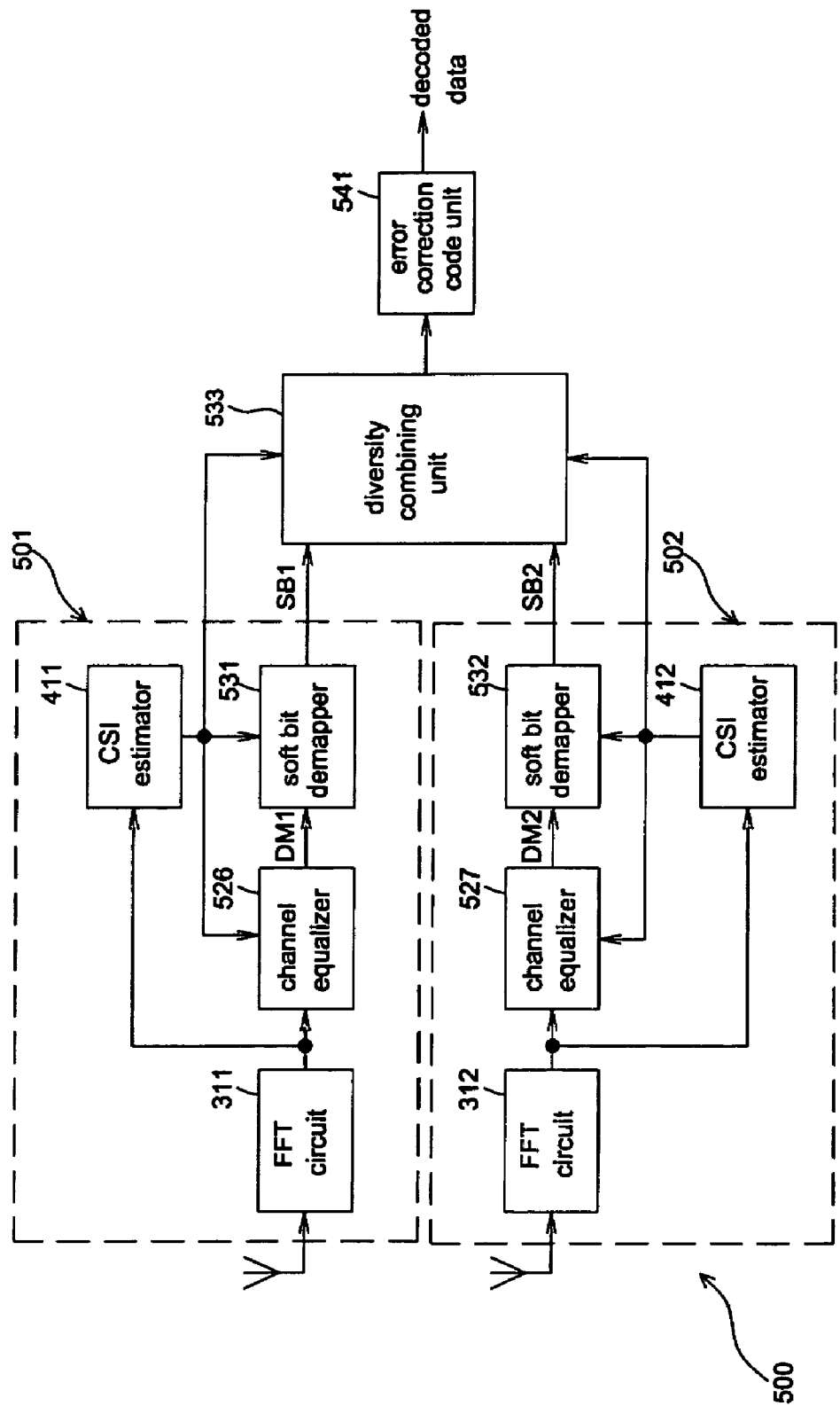
FIG. 5A is a block diagram of a diversity receiver according to a first embodiment of the invention.

FIG. 5A is a block diagram of a diversity receiver according to a first embodiment of the invention. In the first embodiment, the demodulator 460 shown in FIG. 4B is implemented with two FFT circuits 311, 312 and two channel equalizer 526, 527 while the combining and demapping device 470 shown in FIG. 4B is implemented with two soft bit demapper 531, 532 and a diversity combining unit 533.

Referring to FIG. 5A, according to the first embodiment, a diversity receiver 500 has two identical branches 501, 502 for receiving a first version of an input signal and a second version of an input signal. It comprises two FFT circuits 311, 312, two channel equalizers 526, 527, two channel state information estimators 411, 412, two soft bit demappers 531, 532, a diversity combining unit 533 and an error correction code unit 541. Since both of these two branches are identical for receiving and processing different versions of the input signal, only the branch 501 will be described below. Suppose that the FFT circuit 311 receives the first version of the input signal and generates a frequency-domain signal after performing Fourier transformation. The channel state information estimators 411 fetches the frequency-domain signal and extracts the contained reference signals (e.g. pilot signal) from the frequency-domain signal to produce a set of channel frequency response estimates $H_1$ and the channel parameter $CSI_1$. The channel equalizer 526 receives the frequency-domain signal and generates a first demodulated signal DM1 with respect to the set of channel frequency response estimates $H_1$ generated by the channel state information estimator 411. The soft bit demapper 531 firstly receives the first demodulated signal DM1, determines whether to modify the decision boundary and then performs symbol demapping to finally generate a first soft bit signal SB1.

Figure 5B:
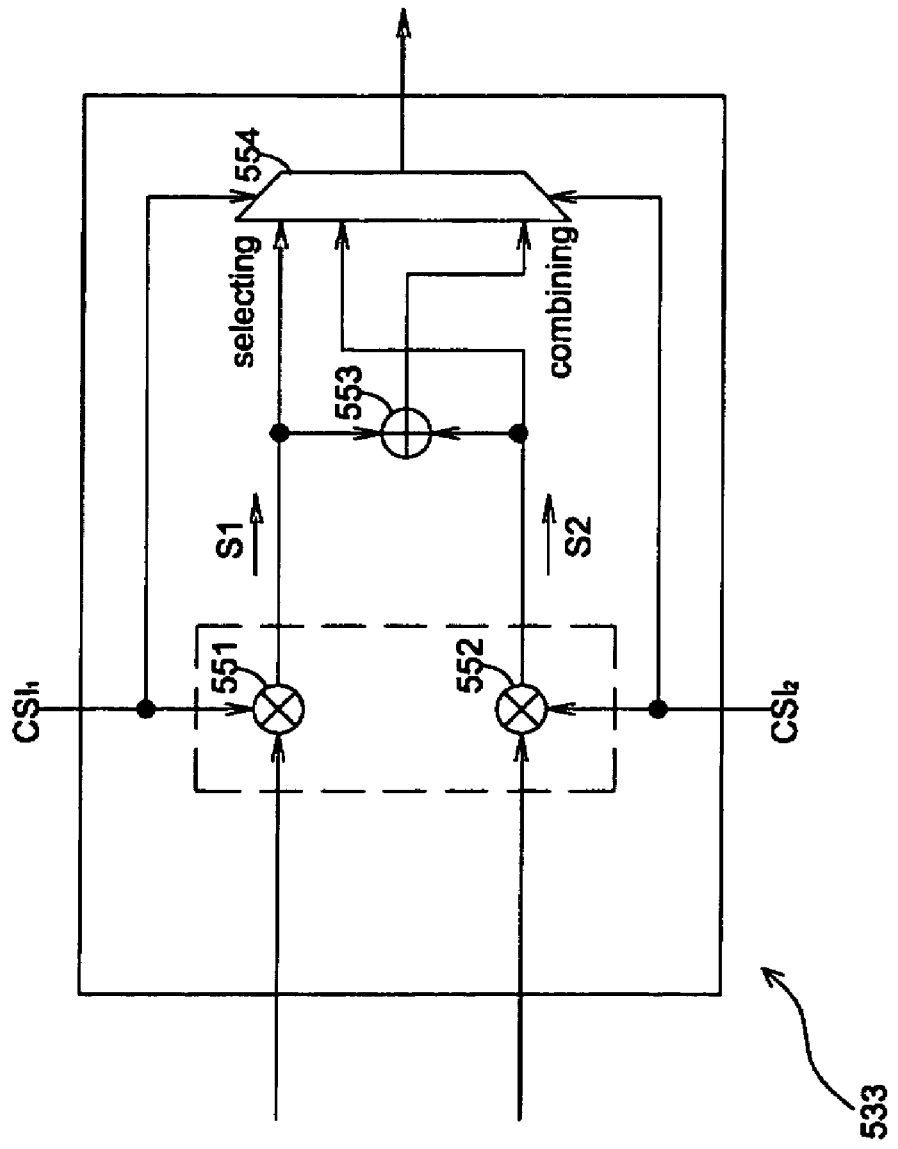
FIG. 5B is a more detailed block diagram of the diversity combining unit shown in FIG. 5A.

FIG. 5B is a more detailed block diagram of the diversity combining unit shown in FIG. 5A. Referring to FIG. 5B, the first soft bit signal SB1 and the second soft bit signal SB2 enter the diversity combining unit 533 and then are respectively multiplied by one of channel parameters $CSI_1$, $CSI_2$ at multipliers 551, 552 so that two sets of multiplied signals S1, S2 are generated. Next, channel conditions of the first and the second branches are measured based on channel parameters $CSI_1$, $CSI_2$ derived from channel state information estimators 411, 412. For example, channel parameters $CSI_1$, $CSI_2$ can be signal-to-noise ratio estimates SNR1, SNR2. After these two signal-to-noise ratio estimates SNR1, SNR2 are compared, a combined signal (S1+S2) or a selected signal (from one of two signals S1, S2) is sent from multiplexer 554. In the diversity combining unit 533, depending on different architectures of receivers, the signal combining or signal selecting scheme is operated at different levels, such as symbol-level, subcarrier-level, or bit-level. As shown in FIG. 5A, the diversity combining unit 533 performs bit-level signal combining operation or selecting operation and generates a pre-correction signal.

Lastly, the error correction code unit 541 receives the pre-correction signal and makes error corrections. The error correction code unit 541 can be implemented with a channel decoder, such as Viterbi decoder, Reed-Solomon decoder or de-interleaver.

In each of the first to the eighth embodiments of the invention, there is provided at least a channel state information estimator fetching the frequency-domain signal for estimation. Thus, the apparatus comprising the channel state information estimator is called diversity receiver with frequency-domain channel state information estimation. In addition to channel frequency response estimates H, channel state information estimators 411, 412 also generate channel parameters CSI in the diversity receiver with frequency-domain channel state information estimation. The channel parameter CSI includes sub-parameters like signal-to-noise ratio estimates SNR, channel power estimates $|H|^2$, noise power estimates $\sigma^2$ and so on. Each sub-parameter includes a symbol level and a sub-carrier level. A symbol-level sub-parameter is equivalent to the average value of all respective subcarrier-level sub-parameters. For example, while the estimation is performed using the frequency-domain channel state information, the symbol-level signal-to-noise ratio estimate is the average value of all respective subcarrier-level signal-to-noise ratio estimates Since the diversity combining unit 533 shown in FIG. 5A is positioned after soft bit demappers 531, 532, the receiver 500 is called post-demapper diversity receiver. For post-demapper diversity receivers, there are after-mentioned configurations of the second to the fifth embodiments depending on different parameters used by the channel equalizer, the soft bit demapper and the diversity combining unit, or on whether the decision boundary needs to be modified by the soft bit demapper. For clear indication of all parameters, the second to the fifth embodiments are all described in the forms of equivalent circuits.

Figure 5C:
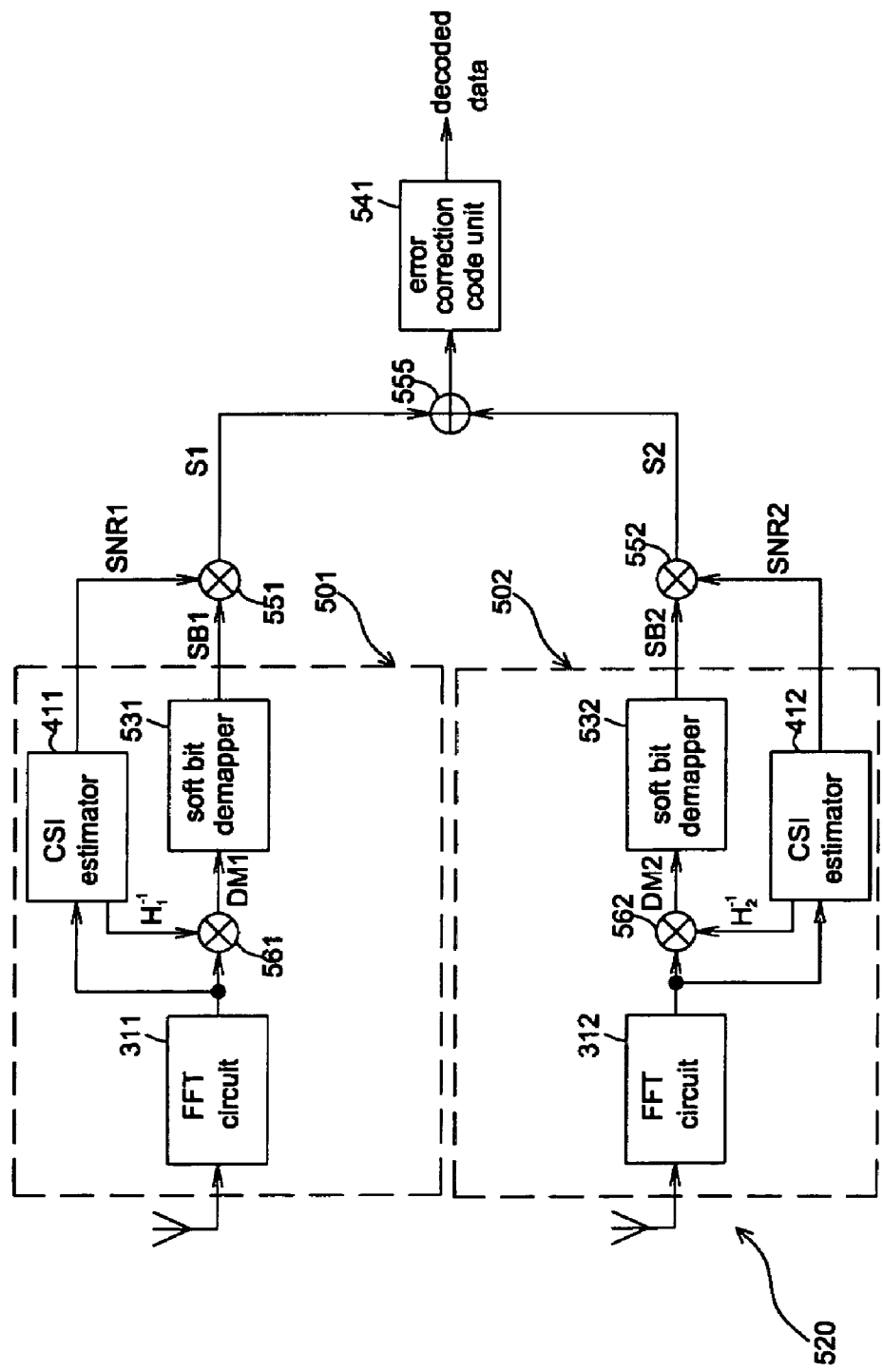
FIG. 5C is an equivalent circuit of a diversity receiver according to a second embodiment of the invention.

FIG. 5C is an equivalent circuit of a diversity receiver according to a second embodiment of the invention. Referring to FIG. 5A and FIG. 5C, channel equalizers 526, 527 are respectively equivalent to multipliers 561, 562 while the diversity combining unit 533 is equivalent to combination of multipliers 551, 552 and an adder 553. It should be noted that the adder 553 and a multiplexer 554 are merged into an adding and multiplexing unit 555 for simplicity. Regarding the branch 501 shown in FIG. 5C, firstly, the frequency-domain signal outputted from the FFT circuit 311 is multiplied by a reciprocal $H_1^{-1}$ of the channel frequency response estimate (or divided by the channel frequency response estimate $H_1$) so that the first demodulated signal DM1 is generated. While receiving the first demodulated signal DM1, the soft bit demapper 531 need not modify the decision boundary, but directly performs symbol demapping to generate the first soft bit signal SB1. After the first soft bit signal SB1 and the second soft bit signal SB2 are fed to the diversity combining unit 533, the multiplier 551 multiplies the first soft bit signal SB1 by the signal-to-noise ratio estimate SNR1 to generate the multiplied signal S1 while the multiplier 552 multiplies the second soft bit signal SB2 by the signal-to-noise ratio estimate SNR2 to generate the multiplied signal S2.

In addition, after SB1 and SB2 respectively sent to the diversity combining unit 533, the first soft bit signal SB1 and the second soft bit signal SB2 can also be multiplied by either the symbol-level signal-to-noise ratio average estimates or the subcarrier-level signal-to-noise ratio estimates. Then, the diversity combining unit 533 measures the channel conditions of the first and the second branches 501, 502 based on the channel parameters $CSI_1$, $CSI_2$ derived from channel state information estimators 411, 412 in order to perform bit-level signal combining or selecting operations and finally generates the pre-correction signal.

Figure 5D:
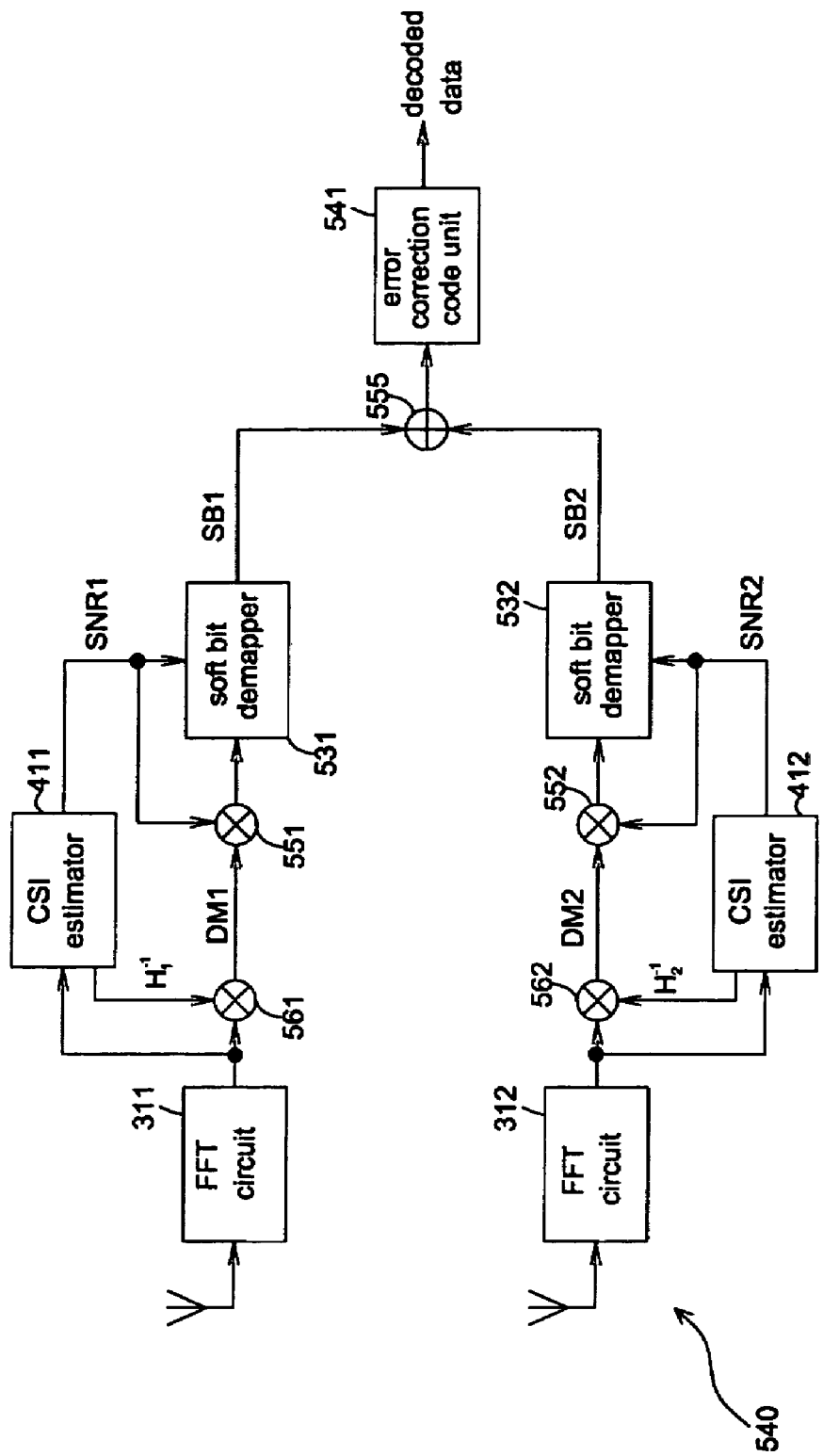
FIG. 5D is an equivalent circuit of a diversity receiver according to a third embodiment of the invention.

FIG. 5D is an equivalent circuit of a diversity receiver according to a third embodiment of the invention. Since the front circuits to generate the first and the second demodulated signals DM1, DM1 are the same for both architectures shown in FIG. 5C and FIG. 5D, the description is omitted here. Referring to FIG. 5D, as for the branch 501, the multiplier 551 multiplies the first demodulated signal DM1 by the signal-to-noise ratio estimate SNR1. The soft bit demapper 531 modifies the decision boundary with the signal-to-noise ratio estimate SNR1, and performs symbol demapping to generate the first soft bit signal SB1. After the first soft bit signal SB1 and the second soft bit signal SB2 enter the diversity combining unit 533, bit-level signal combining or selecting operations are performed to generate the pre-correction signal.

Figure 5E:
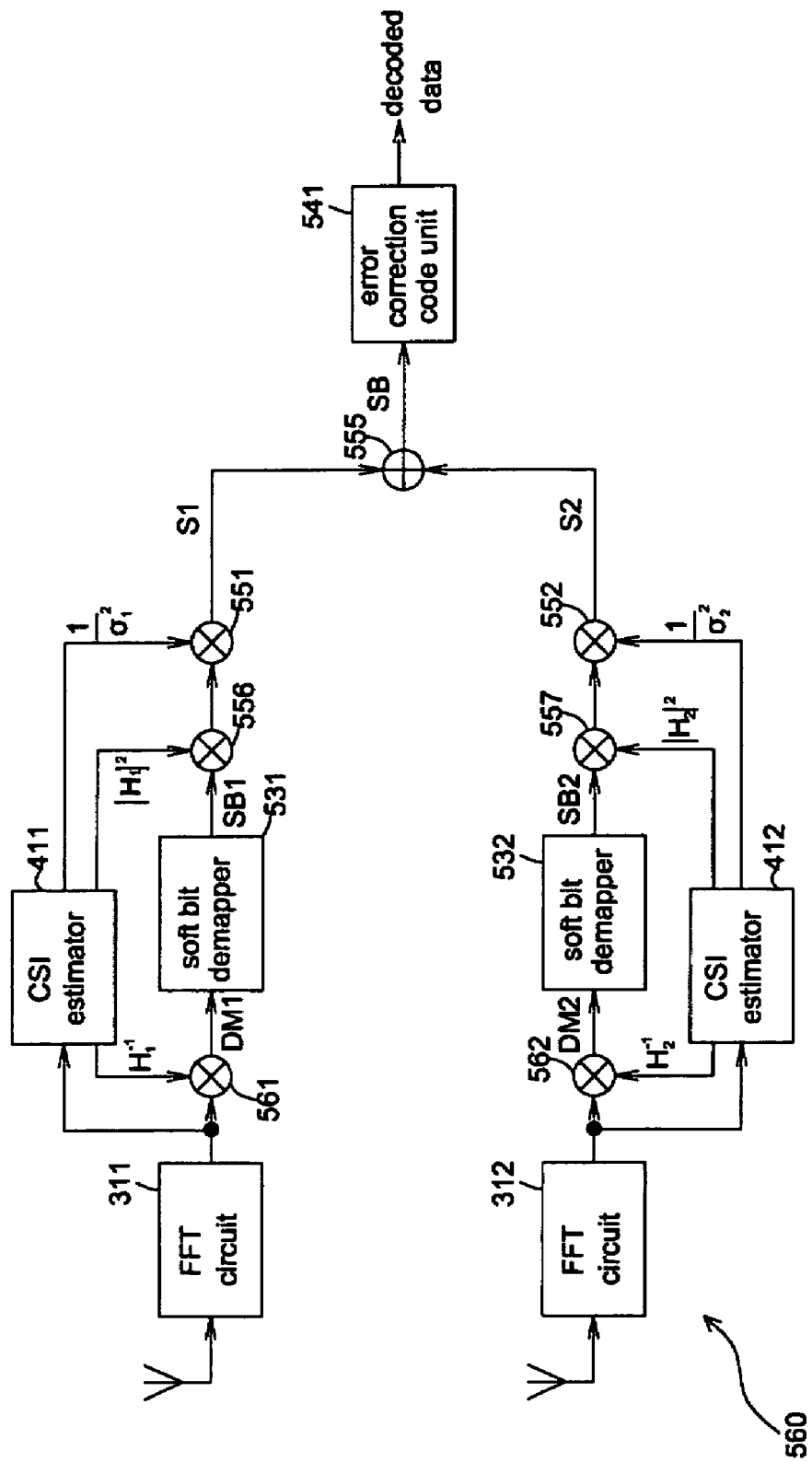
FIG. 5E is an equivalent circuit of a diversity receiver according to a fourth embodiment of the invention.

FIG. 5E is an equivalent circuit of a diversity receiver according to a fourth embodiment of the invention. Since the front circuits to generate the first and the second demodulated signals DM1, DM1 are the same for both architectures shown in FIG. 5C and FIG. 5E, the description is omitted here. Referring to FIG. 5E, after the first and the second soft bit signals SB1, SB2 are passed to the diversity combining unit 533, the multipliers 556, 551 successively multiply the first soft bit signal SB1 by the channel power estimate $|H_1|^2$ and a reciprocal $(1/\sigma_1^2)$ of the noise power estimate to generate the multiplied signal S1. Meanwhile, the multiplied signal S2 is generated after the same signal processing is applied over the second soft bit signal SB2. The pre-correction signal is generated after the bit-level signal combining or selecting operations are performed.

Figure 5F:
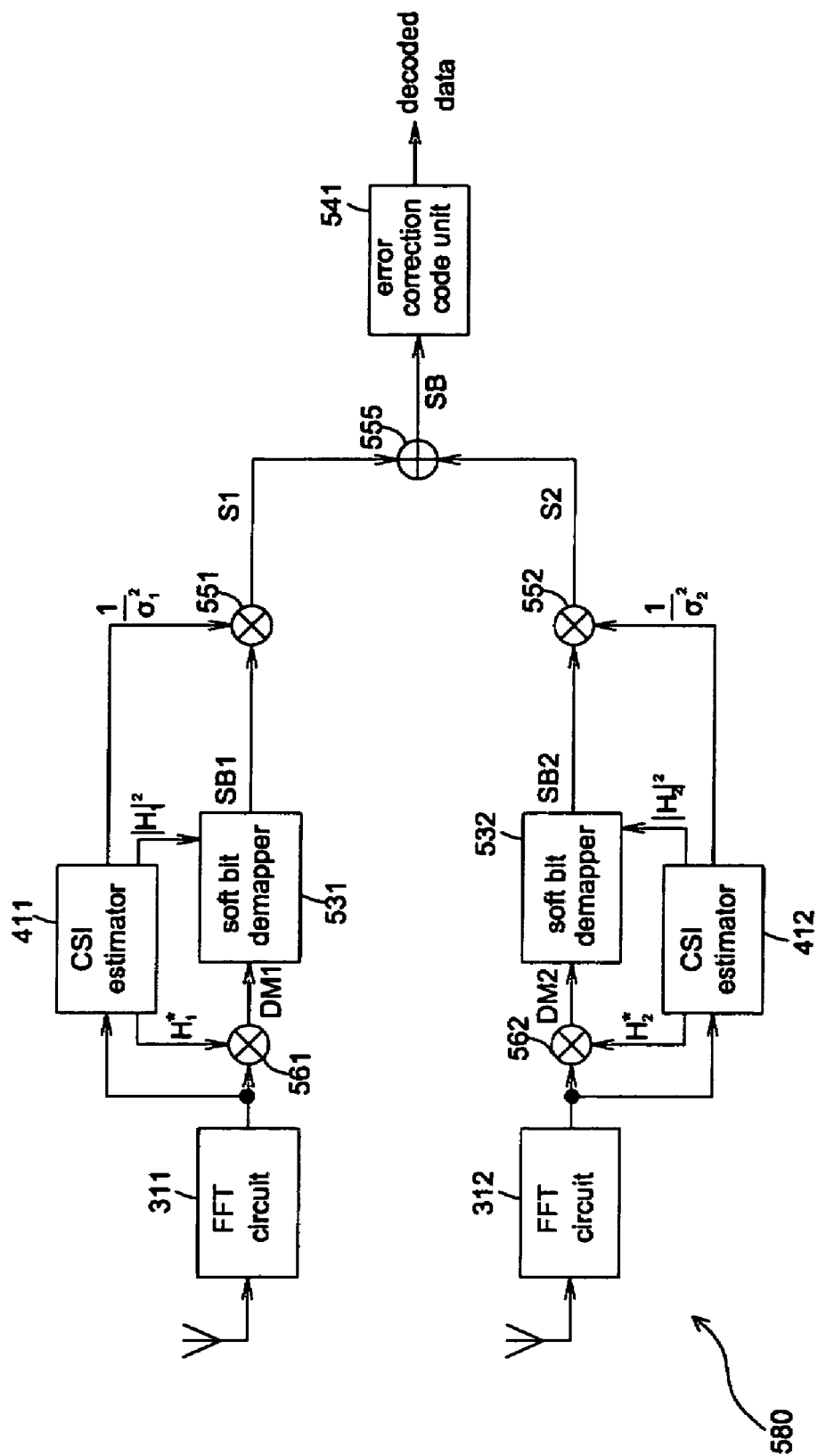
FIG. 5F is an equivalent circuit of a diversity receiver according to a fifth embodiment of the invention.

FIG. 5F is an equivalent circuit of a diversity receiver according to a fifth embodiment of the invention. Referring to FIG. 5F, as for the branch 501, firstly, the frequency-domain signal outputted from the FFT circuit 311 is multiplied by a complex conjugate $H_1^*$ of the channel frequency response estimate so that the first demodulated signal DM1 is generated. Upon receiving the first demodulated signal DM1, the soft bit demapper 531 modifies the decision boundary with the channel power estimate $|H_1|^2$, performs symbol demapping and then generates the first soft bit signal SB1. After the first and the second soft bit signals SB1, SB2 are respectively fed to the diversity combining unit 533, the multiplier 551 multiplies the first soft bit signal SB1 by the reciprocal $(1/\sigma_1^2)$ of the noise power estimate to yield the multiplied signal S1 while the multiplier 552 multiplies the first soft bit signal SB2 by the reciprocal $(1/\sigma_2^2)$ of the noise power estimate to yield the multiplied signal S2. Next, the diversity combining unit 533 measures the channel conditions of the first and the second branches 501, 502 based on the channel parameters $CSI_1$, $CSI_2$ derived from channel state information estimators 411, 412 and then performs bit-level signal combining or selecting operations, therefore generating the pre-correction signal.

Figure 6A:
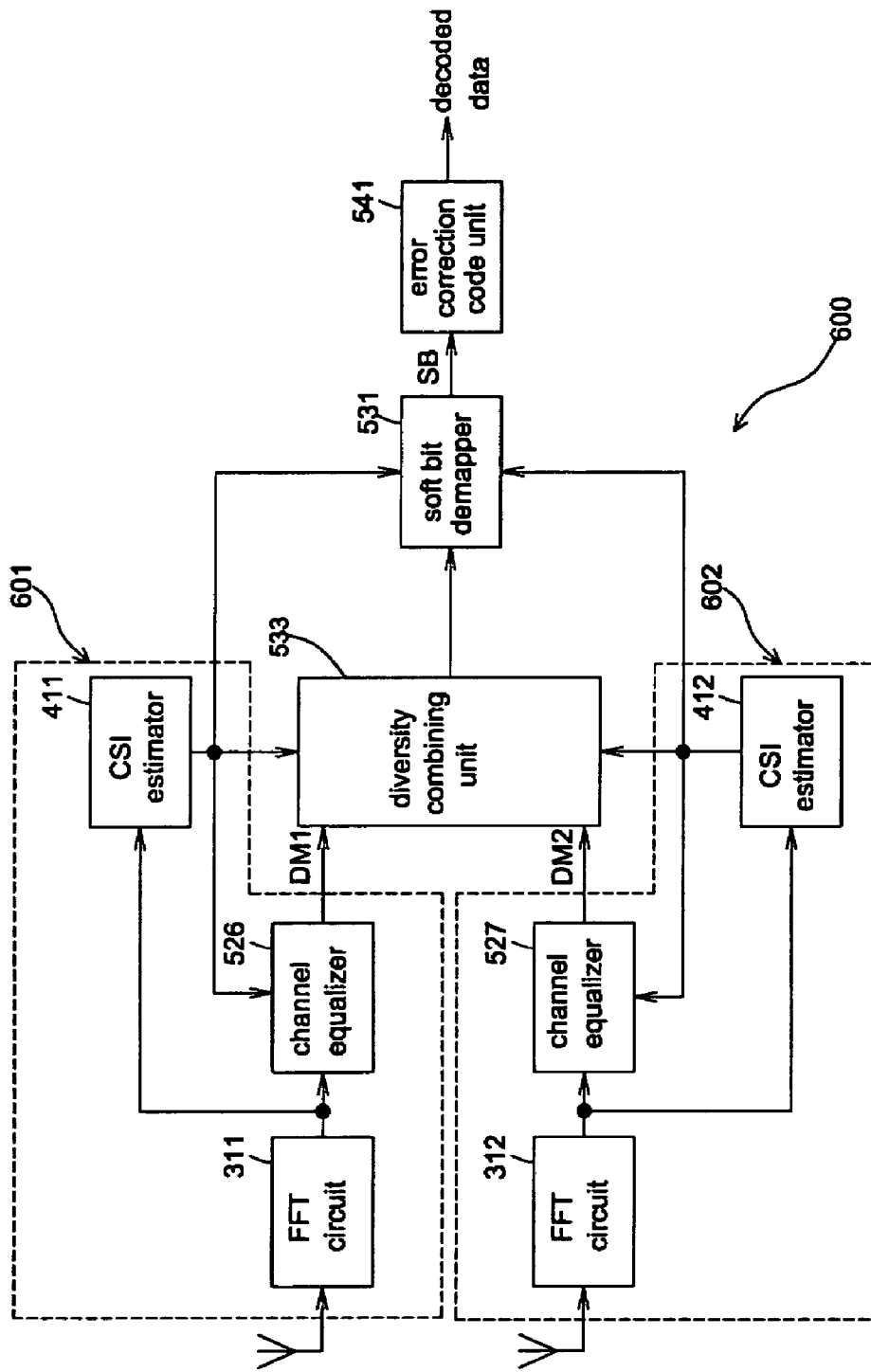
FIG. 6A is a block diagram of a diversity receiver according to a sixth embodiment of the invention.

FIG. 6A is a block diagram of a diversity receiver according to a sixth embodiment of the invention. In this embodiment, the combining and demapping device 470 shown in FIG. 4B is implemented with a diversity combining unit 533 and a soft bit demapper 531. Further, in the diversity combining unit 533, the signal combining or signal selecting scheme can be operated at a symbol level or a subcarrier-level. Since the other architecture of this embodiment is the same as that of the first embodiment, the description is omitted here.

Referring to FIG. 6A, according to the sixth embodiment, a diversity receiver 600 has two branches 601, 602 for receiving a first version and a second version of an input signal. It comprises two FFT circuits 311, 312, two channel equalizer 526, 527, two channel state information estimators 411~412, a soft bit demapper 531, a diversity combining unit 533 and an error correction code unit 541. Since the front circuits to generate the first and the second demodulated signal DM1, DM1 are the same for both architectures shown in FIG. 5A and FIG. 6A, the description is omitted here. The diversity combining unit 533 receives and then respectively multiplies the first and the second soft bit signals SB1, SB2 by one of channel parameters $CSI_1$, $CSI_2$. Next, the diversity combining unit 533 measure channel conditions of the first and the second branches based on channel parameters $CSI_1$, $CSI_2$ derived from channel state information estimators 411, 412 and then performs the signal combining or selecting operations at a symbol-level or a subcarrier-level.

Since the diversity combining unit 533 shown in FIG. 6A is positioned after both channel equalizer 526, 527, the receiver 600 is called post-CE (post channel equalizer) diversity receiver. For post-CE diversity receivers, there are after-mentioned configurations of the seventh to the eighth embodiments of the invention depending on different parameters used by the channel equalizer, the soft bit demapper, and the diversity combining unit, or on whether the decision boundary needs to be modified by the soft bit demapper. For clear indication of all parameters, the seventh and the eighth embodiments are all described in the forms of equivalent circuits.

Figure 6B:
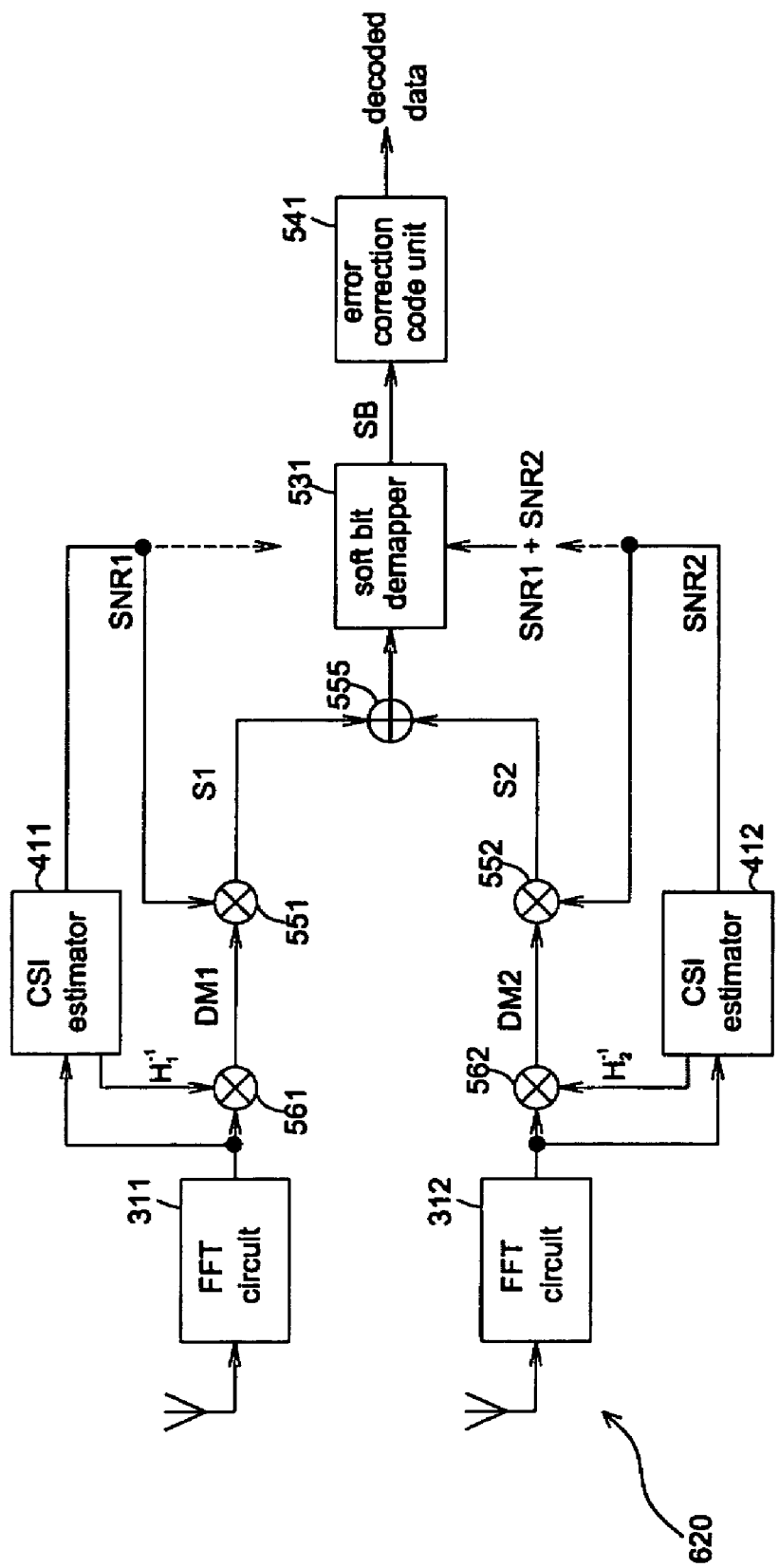
FIG. 6B is an equivalent circuit of a diversity receiver according to a seventh embodiment of the invention.

FIG. 6B is an equivalent circuit of a diversity receiver according to a seventh embodiment of the invention. Since the front circuits to generate the first and the second demodulated signal DM1, DM1 are the same for both architectures of the second and the seventh embodiments, the description is omitted here. Referring to FIG. 6B, after the first and the second demodulated signals DM1, DM2 are passed to the diversity combining unit 533, the multiplier 551 multiplies the first demodulated signal DM1 by the signal-to-noise ratio estimate SNR1 to generate the multiplied signal S1 while the multiplier 552 multiplies the second demodulated signal DM2 by the signal-to-noise ratio estimate SNR2 to generate the multiplied signal S2. Next, the diversity combining unit 533 performs the signal combining or selecting operations at either a symbol-level or a subcarrier-level to generate a combined signal. Upon receiving the combined signal, the soft bit demapper 531 modifies the decision boundary with a sum (SNR1+SNR2) of the signal-to-noise ratio estimates of both branches, performs symbol demapping and eventually generates the pre-correction signal.

Figure 6C:
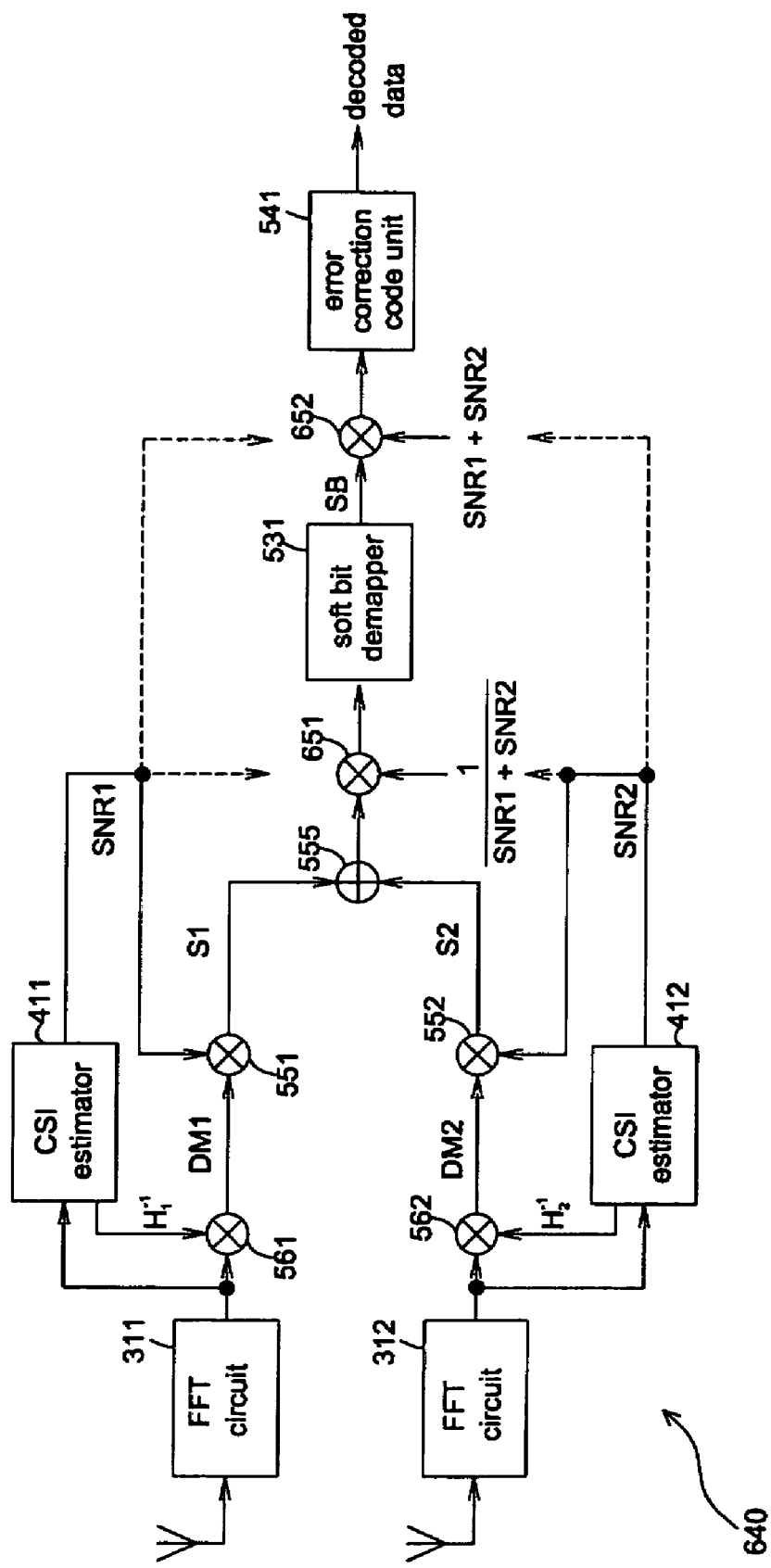
FIG. 6C is an equivalent circuit of a diversity receiver according to an eighth embodiment of the invention.

FIG. 6C is an equivalent circuit of a diversity receiver according to an eighth embodiment of the invention. Since the front circuits to generate the combined signal are the same for both architectures of the seventh and the eighth embodiments, the description is omitted here. Referring to FIG. 6C, after the combined signal is provided to the soft bit demapper 531, the multiplier 651 multiplies the combined signal by the reciprocal $1/(SNR_1+SNR_2)$ of the sum of the signal-to-noise ratio estimates of both branches, performs symbol demapping and then generates the soft bit signal SB. Afterwards, the multiplier 652 multiplies the soft bit signal SB by the sum $(SNR_1+SNR_2)$ of the signal-to-noise ratio estimates of both branches and finally generates the pre-correction signal.

In the above-mentioned embodiments, the sources that the channel state information estimators fetch are frequency-domain signals. In order to decrease the computing volume, the channel state information estimators can also fetch time-domain signals. In that case, it is a diversity receiver with time-domain channel state information estimation. Hereinafter, the architectures of diversity receivers with time-domain channel state information estimation will be described with two embodiments.

Figure 7:
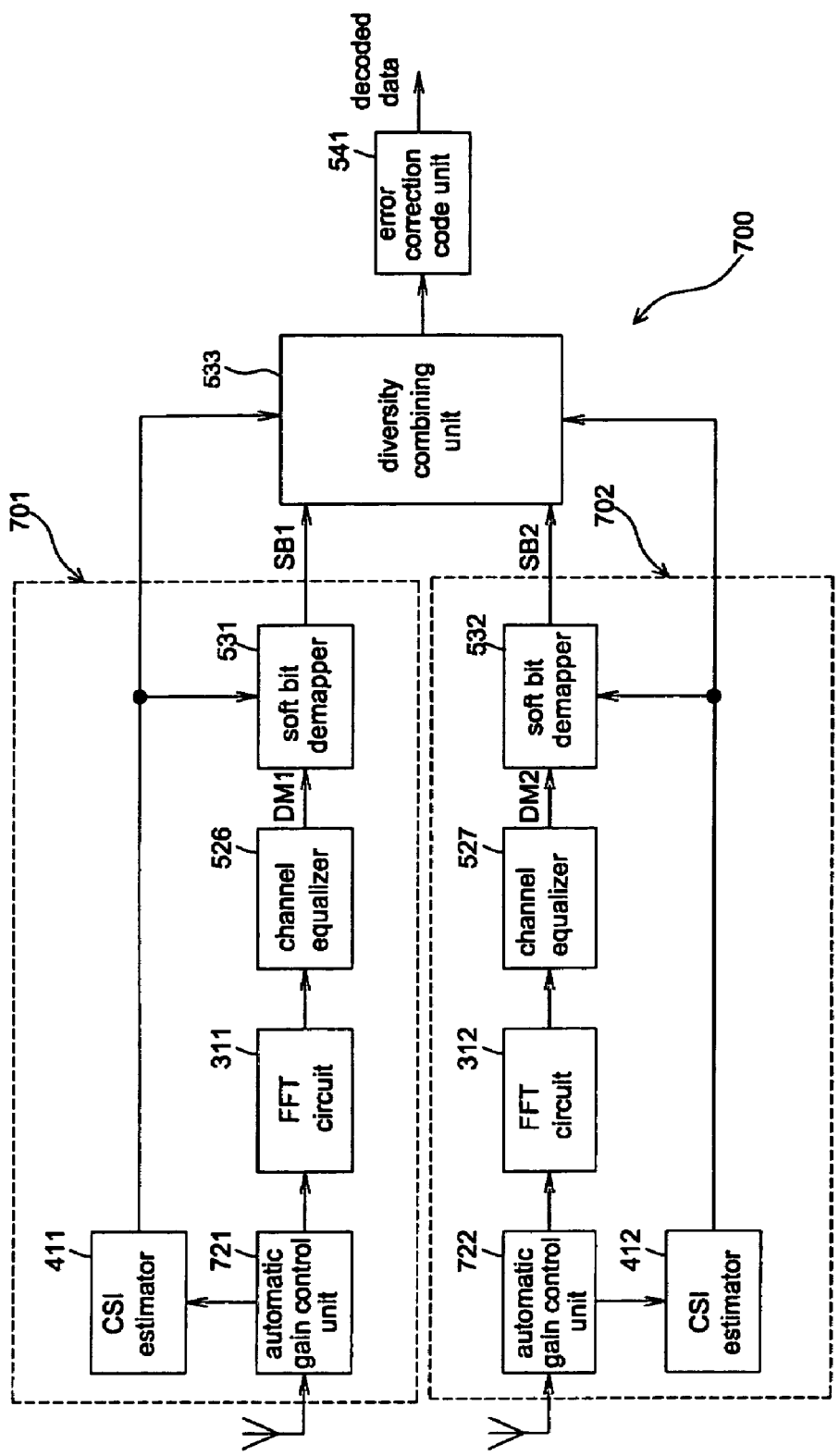
FIG. 7 is a block diagram of a diversity receiver according to a ninth embodiment of the invention.

FIG. 7 is a block diagram of a diversity receiver according to a ninth embodiment of the invention. In this embodiment, the demodulator 460 shown in FIG. 4B is implemented with two automatic gain control units 721, 722, two FFT circuits 311, 312 and two channel equalizers 526, 527. Compared with the first embodiment, the diversity receiver 700 in the ninth embodiment additionally includes two automatic gain control units 721, 722 which provide time-domain signals to channel state information estimators 411, 412 for deriving channel parameters. However, while fetching the time-domain signals for channel parameters, channel state information estimators 411, 412 are not capable of calculating the channel frequency response estimate H. This is because computing the channel frequency response estimate H must utilize the information contained within the frequency-domain signals. Therefore, the task of calculating the channel frequency response estimate H is assigned to channel equalizers 526, 527 which need to use the channel frequency response estimate H. Nevertheless, in practice, the generation of the channel frequency response estimate H is not be limited to the previous discussed description. In alternative embodiments, the channel frequency response estimate H can be generated by employing the time-domain channel impulse response estimation functions of the channel state information estimator 411(412) and passing the output of the channel state information estimator 411(412) to the FFT circuit 311(312).

Regarding the branch 701, it includes an automatic gain control unit 721, a FFT circuit 311, a channel equalizer 526, a soft bit demapper 531 and a channel state information estimator 411. Suppose that the automatic gain control unit 721 receives the first version of an input signal (a time-domain signal in this case), then magnifies or attenuates the input signal, depending on the power level of the first version of the input signal. Basically, after the time-domain signal of the automatic gain control unit 721 is fed to the channel equalizer 311, the back end circuits of the automatic gain control unit 721 perform the same signal processing as those of the first embodiment do, yet an additional calculation for channel frequency response estimate H is added to the channel equalizer 526.

Figure 8:
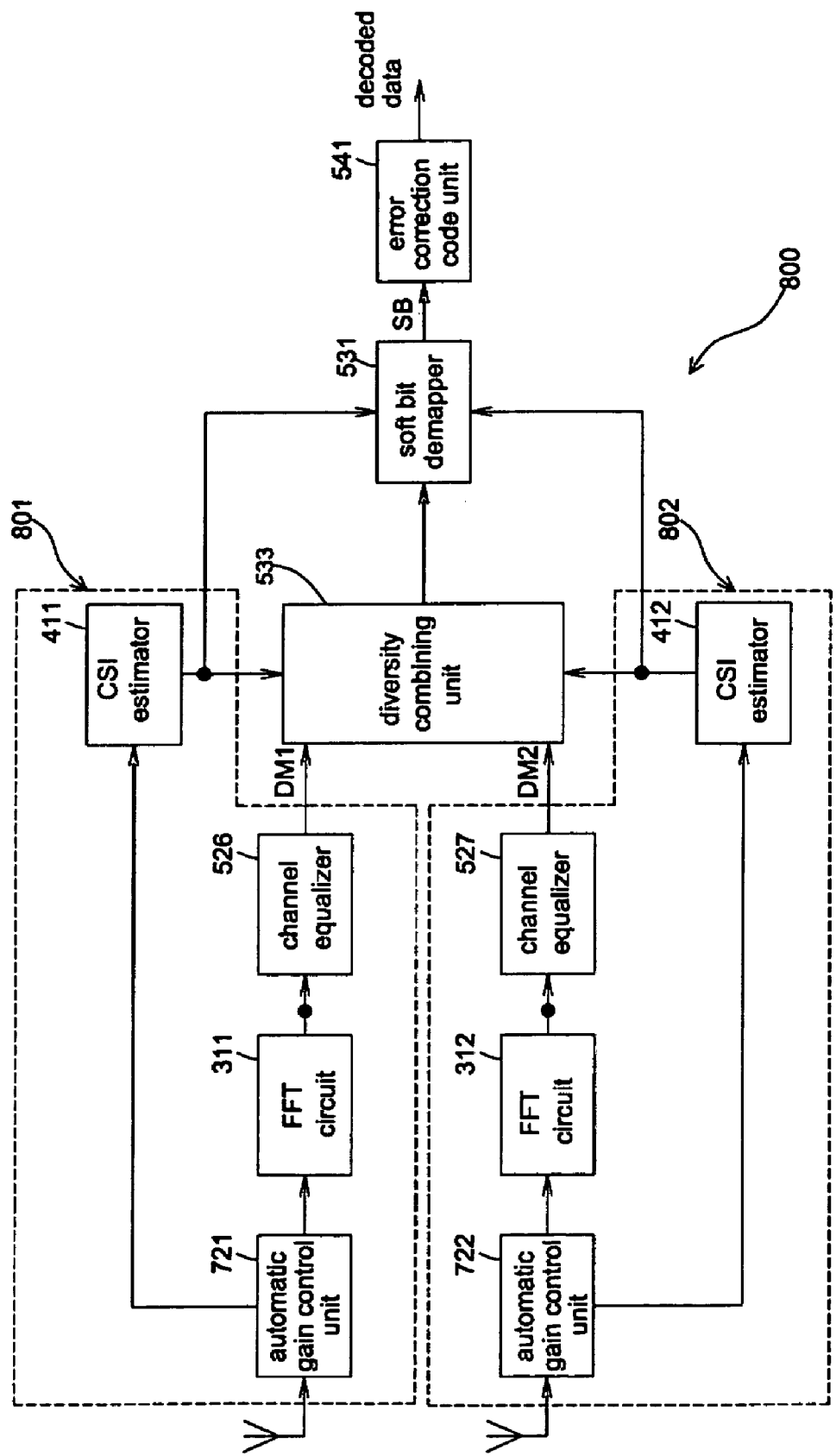
FIG. 8 is a block diagram of a diversity receiver according to a tenth embodiment of the invention.

Since the ninth embodiment is featured as the post-demapper diversity receiver, the different architectures of the second to the fifth embodiments, which are based on different parameters used by the channel equalizer, the soft bit demapper, and the diversity combining unit, or on whether the decision boundary needs to be modified by the soft bit demapper, are also applicable to the ninth embodiment FIG. 8 is a block diagram of a diversity receiver according to a tenth embodiment of the invention. Compared with the sixth embodiment, the diversity receiver in the tenth embodiment additionally includes two automatic gain control units 721, 722 for providing time-domain signals to channel state information estimators 411, 412. Since the other architecture of this embodiment is the same as that of the sixth embodiment; therefore, the description is omitted here. Due to the tenth embodiment featured as the post-CE diversity receiver, the different architectures of the seventh and the eighth embodiments, which are based on different parameters used by the channel equalizer, the soft bit demapper, and the diversity combining unit, or on whether the decision boundary needs to be modified by the soft bit demapper, are also applicable to the tenth embodiment Note that there is a limitation to channel parameters derived from channel state information estimators 411, 412 using time-domain signals. In other words, the channel parameters are symbol-level averages, such as signal-to-noise ratio average estimates SNR, channel power average estimates $|H|^2$, noise power average estimates $\sigma^2$ rather than subcarrier-level respective estimates.

The invention provides a variety of hardware configurations, allowing users to select either time-domain or frequency-domain channel state estimation, based on system design complexity or signal quality requirements. Meanwhile, the invention also provides various locations for signal combining and different channel parameters in order to acquire all valuable gains, therefore enhancing signal quality and maintaining stability of the system.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A diversity receiver having N branches for receiving M versions of an input signal, the diversity receiver comprising:
   a demodulator for receiving the M versions of the input signal, and generating M demodulated signals in accordance with a set of channel frequency response estimates after demodulation;
   N channel state information estimators, equipped for the N branches respectively, for individually fetching signals from the demodulator and producing channel parameters each related to one of the M versions of the input signal; and
   a combining and demapping device for generating a pre-correction signal after respectively receiving the M demodulated signals to perform signal combining and symbol demapping in accordance with the channel parameters respectively related to each said version of the input signal;
   wherein N, M are integers, and N≧2, M≧2;
   wherein the combining and demapping device comprises:
   a diversity combining unit for receiving the M demodulated signals, respectively multiplying by the channel parameters as weighting factors to produce M sets of multiplied signals, and then performing signal combining or selecting operations to generate a combined signal based on channel conditions of the N branches; and
   a soft bit demapper for receiving the combined signal, performing symbol demapping and generating the pre-correction signal.

2. The diversity receiver of claim 1, further comprising an error correction code unit for correcting the pre-correction signal.

3. The diversity receiver of claim 1, wherein the set of channel frequency response estimates related to each said version of the input signal is a set of subcarrier-level frequency response estimates.

4. The diversity receiver of claim 1, wherein the demodulator, comprises:
   a FFT circuit equipped for each said branch, for generating a frequency-domain signal after receiving one of the M versions of the input signal and performing Fourier transformation; and
   a channel equalizer equipped for each said branch, for receiving the frequency-domain signal and generating one of the M demodulated signals in accordance with the set of channel frequency response estimates related to the one of the M versions of the input signal.

5. A diversity receiver having N branches for receiving M versions of an input signal, the diversity receiver comprising:
   a demodulator for receiving the M versions of the input signal, and generating M demodulated signals in accordance with a set of channel frequency response estimates after demodulation;
   N channel state information estimators, equipped for the N branches respectively, for individually fetching signals from the demodulator and producing channel parameters each related to one of the M versions of the input signal, wherein N, M are integers, and N≧2, M≧2; and
   a combining and demapping device for generating a pre-correction signal after respectively receiving the M demodulated signals to perform signal combining and symbol demapping in accordance with the channel Parameters each related to each said version of the input signal;
   wherein the combining and demapping device comprises:
   N soft bit demappers, equipped for N branches respectively, for generating M soft bit signals after receiving the M demodulated signals and performing symbol demapping; and
   a diversity combining unit for receiving the M soft bit signals, respectively multiplying by the channel parameters to produce M sets of multiplied signals, and then performing signal combining or selecting operations based on the channel conditions of N branches to output the pre-correction signal.

6. The diversity receiver of claim 5, wherein the diversity combining unit performs bit-level, signal combining or selecting operations to output the pre-correction signal according to the channel parameter related to each said version of the input signal.

7. The diversity receiver of claim 5, wherein the channel state information estimator for each said branch fetches the frequency-domain signal to generate the set of channel frequency response estimates and the channel parameter.

8. The diversity receiver of claim 7, wherein the channel equalizer divides the frequency-domain signal by the set of channel frequency response estimates to generate one of the M demodulated signals.

9. The diversity receiver of claim 8, wherein the channel parameter related to each said version of the input signal comprises a set of signal-to-noise ratio estimates being a set of either symbol-level average estimates or subcarrier-level estimates.

10. The diversity receiver of claim 8, wherein the channel parameter related to each said version of the input signal comprises a first set of channel sub-parameters and a second set of channel sub-parameters, the first set of channel sub-parameters comprising a set of either channel power average estimates or subcarrier-level channel power estimates the second set of channel sub-parameters comprising a set of reciprocals of either noise power average estimates or subcarrier-level noise power estimates.

11. The diversity receiver of claim 10, wherein the diversity combining unit receives the M soft bit signals, and successively multiplies by the first set channel sub-parameters and the second set of channel sub-parameters to produce the M sets of multiplied signals.

12. The diversity receiver of claim 7, wherein the channel equalizer for each branch multiplies the frequency-domain signal by the set of complex conjugates of channel frequency response estimates to generate one of the M demodulated signals.

13. The diversity receiver of claim 12, wherein the channel parameter related to each said version of the input signal comprises a first set of channel sub-parameters and a second set of channel sub-parameters, the first set of channel sub-parameters comprising a set of either channel power average estimates or subcarrier-level channel power estimates, the second set of channel sub-parameters comprising a set of reciprocals of either noise power average estimates or subcarrier-level noise power estimates.

14. The diversity receiver of claim 13, wherein the soft bit demapper for each branch modifies a decision boundary with the first set of channel sub-parameters, the diversity combining unit respectively multiplying the M soft bit signals by the second set of channel sub-parameters to generate the M sets of multiplied signals.

15. The diversity receiver of claim 5, wherein the demodulator further comprises N automatic gain control units, positioned respectively before the FFT circuit for each said branch, each automatic gain control unit for magnifying or attenuating a time-domain signal.

16. The diversity receiver of claim 15, wherein the channel state information estimator fetches the frequency-domain signal to generate the channel parameter for each said branch.

17. The diversity receiver of claim 16, wherein the channel equalizer for each branch divides the frequency-domain signal by the set of channel frequency response estimates to generate one of the M demodulated signals.

18. The diversity receiver of claim 16, wherein the set of channel frequency response estimates related to each version of the input signal is generated by the channel equalizer of the branch.

19. The diversity receiver of claim 16, wherein the set of channel frequency response estimates related to each said version of the input signal is generated by performing time-domain channel impulse response estimation at the channel state estimator and sending an output of the channel state estimator to the FET circuit for each said branch.

20. The diversity receiver of claim 17, wherein the channel parameter related to each said version of the input signal comprises a set of signal-to-noise ratio average estimates.

21. The diversity receiver of claim 17, wherein the channel parameter related to each said version of the input signal comprises a set of channel power average estimates and a set of reciprocals of noise power average estimates.

22. The diversity receiver of claim 21, wherein the diversity combining unit receives the M soft bit signals, and successively multiplies by the set of channel power average estimates and the set of reciprocals of noise power average estimates to generate the M sets of multiplied signals.

23. The diversity receiver of claim 16, wherein the channel equalizer for each said branch multiplies the frequency-domain signal by the set of complex conjugates of channel frequency response estimates to generate one of the M demodulated signals.

24. The diversity receiver of claim 23, wherein the channel parameter related to each said version of the input signal comprises a set of channel power average estimates and a set of reciprocals of noise power average estimates.

25. The diversity receiver of claim 24, wherein the soft bit demapper for each said branch modifies a decision boundary with the set of channel power average estimates, the diversity combining unit respectively multiplying the M soft bit signals by the set of reciprocals of noise power average estimates to generate the M sets of multiplied signals.

26. A diversity receiver having N branches for receiving M versions of an input signal, the diversity receiver comprising:
  a demodulator for receiving the M versions of the input signal, and generating M demodulated signals in accordance with a set of channel frequency response estimates after demodulation;
  N channel state information estimators, equipped for the N branches respectively, for individually fetching signals from the demodulator and producing channel parameters each related to one of the M versions of the input signal; and
  a combining and demapping device for generating a pre-correction signal after respectively receiving the M demodulated signals to perform signal combining and symbol demapping in accordance with the channel Parameters each related to each said version of the input signal, wherein N, M are integers, and N≧2, M≧2;
wherein the combining and demapping device comprises:
  N multipliers, equipped respectively for the N branches, for receiving the M demodulated signals and multiplying by the channel parameter to generate M sets of multiplied signals;
  N soft bit demappers, equipped respectively for the N branches, for receiving the M sets of multiplied signals and respectively modifying a decision boundary with the corresponding channel parameter to produce M soft bit signals; and
  an adding and multiplexing unit for combining or selecting operations of bit-level signal over the M soft bit signals based on the channel conditions of the N branches to output the pre-correction signal;
  wherein the channel equalizer for each said branch divides the frequency-domain signal by the set of channel frequency response estimates to generate one of the M demodulated signals.

27. The diversity receiver of claim 26, wherein the channel state information estimator for each said branch fetches the frequency-domain signal to generate the set of channel frequency response estimates and the channel parameter, the channel parameter comprising a set of either signal-to-noise ratio average estimates or subcarrier-level signal-to-noise ratio estimates.

28. The diversity receiver of claim 26, wherein the demodulator further comprises N automatic gain control units, positioned individually before the FFT circuit for the N branches, each automatic gain control unit for magnifying or attenuating a time-domain signal, and wherein the channel state information estimator for each said branch fetches the time-domain signal and then generates the channel parameter.

29. The diversity receiver of claim 28, wherein the Set of channel frequency response estimates related to each said version of the input signal is generated by the channel equalizer of the branch.

30. The diversity receiver of claim 28, wherein the set of channel frequency response estimates related to each version of the input signal is generated by performing time-domain channel impulse response estimation at the channel state estimator and sending an output of the channel state estimator to the FFT circuit for each said branch.

31. The diversity receiver of claim 28, wherein the set of channel frequency response estimates related to each version of the input signal comprises a set of symbol-level signal-to-noise ratio average estimates.

32. The diversity receiver of claim 1, wherein the diversity combining unit performs either symbol-level or subcarrier-level signal combining or selecting operations based on the corresponding channel parameter related to each version of the input signal.

33. The diversity receiver of claim 1, wherein the channel state information estimator for each said branch fetches the frequency-domain signal to generate the set of channel frequency response estimates and the channel parameter.

34. The diversity receiver of claim 33, wherein the channel equalizer for each said branch divides the frequency-domain signal by the set of channel frequency response estimates to generate one of the M demodulated signals.

35. The diversity receiver of claim 33, wherein the corresponding channel parameter related to each said version of the input signal comprises a set of signal-to-noise ratio estimates, the set of signal-to-noise ratio estimates being a set of either symbol-level average estimates or subcarrier-level estimates.

36. The diversity receiver of claim 35, wherein the soft bit demapper modifies the decision boundary with either a sum of the signal-to-noise ratio estimates or a sum of the signal-to-noise ratio average estimates for the N branches, and performs symbol demapping to output the pre-correction signal.

37. The diversity receiver of claim 35, wherein the soft bit demapper divides an output signal of the diversity combining unit by either a sum of the signal-to-noise ratio estimates or a sum of the signal-to-noise ratio average estimates related to the N branches, ten performs symbol demapping, and finally multiplies by either the sum of the signal-to-noise ratio estimates or the sum of the signal-to-noise ratio average estimates related to the N branches to output the pre-correction signal.

38. The diversity receiver of claim 1, wherein the demodulator further comprises N automatic gain control units, positioned individually before the FFT circuit for the N branches, each automatic gain control unit for magnifying or attenuating a time-domain signal.

39. The diversity receiver of claim 38, wherein the channel state information estimator for each said branch fetches the time-domain signal to generate the channel parameter.

40. The diversity receiver of claim 39, wherein the channel equalizer for each said branch divides the frequency-domain signal by the set of channel frequency response estimates to generate one of the M demodulated signals.

41. The diversity receiver of claim 39, wherein the corresponding set of channel frequency response estimates related to each said version of the input signal is generated correspondingly by the channel equalizer.

42. The diversity receiver of claim 39, wherein the set of channel frequency response estimates related to each said version of the input signal is generated by performing time-domain channel impulse response estimation at the channel state estimator and sending an output of the channel state estimator to the FFT circuit for each said branch.

43. The diversity receiver of claim 40, wherein the channel parameter related to each said version of the input signal is a set of signal-to-noise ratio average estimates.

44. The diversity receiver of claim 43, wherein the soft bit demapper modifies the decision boundary with a sum of the signal-to-noise ratio average estimates related to the N branches, and performs symbol demapping to output the pre-correction signal.

45. The diversity receiver of claim 43, wherein the soft bit demapper divides the output signal of diversity combining unit by a sum of the signal-to-noise ratio average estimates related to the N branches, then performs symbol demapping, and finally multiplies by the sum of the signal-to-noise ratio average estimates related to the N branches to output the pre-correction signal.

46. The diversity receiver of claim 5, further comprising an error correction code unit for correcting the pre-correction signal.

47. The diversity receiver of claim 5, wherein the set of channel frequency response estimates related to each said version of the input signal is a set of subcarrier-level frequency response estimates.

48. The diversity receiver of claim 5, wherein the demodulator comprises:
a FET circuit equipped for each said branch, for generating a frequency-domain signal after receiving one of the M versions of the input signal and performing Fourier transformation; and
a channel equalizer equipped for each said branch, for receiving the frequency-domain signal and generating one of the M demodulated signals in accordance with the set of channel frequency response estimates related to the one of the M versions of the input signal.

49. The diversity receiver of claim 26, further comprising an error correction code unit for correcting the pre-correction signal.

50. The diversity receiver of claim 26, wherein the set of channel frequency response estimates related to each said version of the input signal is a set of subcarrier-level frequency response estimates.

51. The diversity receiver of claim 26, wherein the demodulator comprises:
a FET circuit equipped for each said branch, for generating a frequency-domain signal after receiving one of the M versions of the input signal and performing Fourier transformation; and
a channel equalizer equipped for each said branch, for receiving the frequency-domain signal and generating one of the M demodulated signals in accordance with the set of channel frequency response estimates related to the one of the M versions of the input signal.

* * * * *